Patented Jan. 6, 1953

2,624,734

UNITED STATES PATENT OFFICE 2,624,734

BIPIPERIDINE DERIVATIVES

Moses Wolf Goldberg, Upper Montclair, and Lester Mischa Jampolsky, Clifton, N. J., assignors to Hoffmann-La Roche Inc., Nutley, N. J., a corporation of New Jersey No Drawing. Application April 29, 1950, Serial No. 159,138

5 Claims. (Cl. 260—293)

This invention relates to new chemical compounds, which may be described briefly as 4,4'-bipiperidine derivatives. The nomenclature "4,4'-bipiperidine" and the system of numbering thereof, used in this specification to describe the compounds of the invention, are the same as the nomenclature and numbering system currently used in "Chemical Abstracts."

More particularly, the invention relates to 1,1'-bis-quaternary salts of 4,4'-bipiperidine, that is, to compounds wherein each of the ring nitrogen atoms at the 1 and 1' positions of 4,4'-bipiperidine has been quaternized so that four valence bonds of each nitrogen atom are connected directly to a carbon atom of an organic radical, the fifth ionic bond of each nitrogen atom being connected to an anion. The invention relates further to two bis-tertiary bipiperidine bases, 1,1'-dimethyl-4,4'-bipiperidine and 1,1'-dibenzyl-4,4'-bipiperidine. These bis-tertiary bipiperidine bases are particularly useful in preparing certain of the bis-quaternary salts referred to above; for example, by reaction of said bases with organic quaternizing agents, such as alkyl halides, alkenyl halides, aralkyl halides, aralkenyl halides, cycloalkyl halides, halogen-substituted aliphatic carboxylic esters, alkyl sulfates, alkyl esters of aryl sulfonic acids, and the like.

A specific aspect of the invention is illustrated by a symmetrical bis-quaternary salt of either of the bis-tertiary bipiperidine bases above mentioned with an aralkyl halide or an aralkenyl halide or with a substitution product of either of the foregoing halides; and particularly by a symmetrical bis-quaternary salt of 1,1'-dimethyl-4,4'-bipiperidine with a benzyl halide or a para-substituted benzyl halide, such as benzyl bromide, p-nitrobenzyl bromide, p-chlorobenzyl bromide or 3,4-dimethylbenzyl chloride.

The 1,1'-bis-quaternary salts of 4,4'-bipiperidine are useful in the field of therapeutics, and more particularly are of interest because of their curare-like activity.

The invention is further disclosed in the following examples, which are illustrative but not limitative of the invention, since equivalents will be obvious to those skilled in the art.

EXAMPLE 1

1,1'-dimethyl-4,4'-bipiperidine 100 ml. of 88 per cent formic acid were added, with cooling, to 25 g. of 4,4'-bipiperidine. 40 ml. of 38 per cent formaldehyde were then added and the mixture was refluxed for 16 hours. After cooling, the solution was acidified with 6N HCl and evaporated to dryness in vacuo. The crystalline residue was dissolved in water, made alkaline and extracted well with chloroform. The dried chloroform extracts were evaporated and the residue distilled at 0.1 mm. Hg. The fraction distilling between 67°–77° C. was separately collected; it crystallized on standing. The product was recrystallized from ethyl acetate; M. P. approximately 57°–59° C. It was identified as 1,1'-dimethyl-4,4'-bipiperidine.

By treatment of an alcoholic solution of the above base with an ether solution of hydrogen chloride, the base was converted to 1,1'-dimethyl-4,4'-bipiperidine dihydrochloride, M. P. approximately 314°–316° C. (with decomposition).

EXAMPLE 2

1,1'-dibenzyl-4,4'-bipiperidine

The crystalline material formed by adding 20 g. of benzyl bromide to 10 g. of 4,4'-bipiperidine in 400 ml. of refluxing benzene was dissolved in water, made alkaline and extracted well with ether. The residue obtained by evaporation of the dried ether extract was crystallized from methanol and from acetone. The purified material melted at approximately 132°–134° C. It was identified as 1,1'-dibenzyl-4,4'-bipiperidine.

EXAMPLE 3

1,1'-bis-(2-hydroxyethyl)-4,4'-bipiperidine 20 g. of 4,4'-bipiperidine were dissolved in 400 ml. of water. The solution was cooled to 8° C. and stirred for five minutes with 100 ml. of ethylene oxide. The crystals which formed were filtered off and recrystallized from acetone. The purified material thus obtained melted at approximately 123° C. It was identified as 1,1'-bis-(2-hydroxyethyl)-4,4'-bipiperidine.

EXAMPLE 4

1,1'-bis-(2-cyanoethyl)-4,4'-bipiperidine

A mixture of 200 ml. of acrylonitrile and 7 g. of 4,4'-bipiperidine was refluxed for 1¾ hours. The residue obtained after evaporation of the reaction mixture to dryness was crystallized from methanol three times. The product thus obtained melted at approximately 109° C. It was identified as 1,1'-bis-(2-cyanoethyl)-4,4'-bipiperidine.

EXAMPLE 5

1,1'-bis-(4-ethoxybutyl)-4,4'-bipiperidine 36 ml. of 1-ethoxy-4-bromobutane and 16.8 g.

of 4,4'-bipiperidine were refluxed together for one hour in 150 ml. of ethanol. After standing a few days at room temperature, the hygroscopic crystals which had formed were filtered, dissolved in water, the solution made strongly alkaline and extracted well with ether. The crystalline residue obtained after evaporation of the ether was extracted with petroleum-ether which took up the desired product. The petroleum-ether extract was evaporated to dryness and the residue was recrystallized from dilute methanol; M. P. approximately 52° C. The product was identified as 1,1'-bis-(4-ethoxybutyl)-4,4'-bipiperidine.

EXAMPLE 6

*1,1'-bis-(4-bromobutyl) - 4,4' - bipiperidine dihydrobromide*

4 g. of 1,1'-bis-(4-ethoxybutyl)-4,4'-bipiperidine were dissolved in 25 ml. of 48 per cent hydrobromic acid. After refluxing for 1½ hours, 25 ml. more of the hydrobromic acid were added and the solution was refluxed an additional 3 hours. After standing a few days at room temperature, the crystalline material which had formed was filtered off and recrystallized from water and then again from methanol. The purified material decomposed at approximately 230°–233° C. It was identified as 1,1'-bis-(4-bromobutyl)-4,4'-bipiperidine dihydrobromide.

EXAMPLE 7

*1,1'-bis-[2-(diphenylacetoxy)ethyl]-4,4'-bipiperidine*

To a refluxing solution of toluene containing 2.4 g. of 1,1'-bis-(2-hydroxyethyl)-4,4'-bipiperidine were added 4.4 g. of diphenylacetyl chloride in toluene. An immediate formation of crystals occurred. After refluxing a few minutes, the reaction mixture was cooled and extracted with 6N HCl. The aqueous extract was made alkaline, extracted with ether, and the ether dried and evaporated to a small volume. The crystals which appeared in the ether were twice recrystallized from acetone; M. P. approximately 126°–128° C. The product was identified as 1,1'-bis-[2-(diphenylacetoxy)ethyl]-4,4'-bipiperidine.

EXAMPLE 8

*1,1;1',1'-tetramethyl-4,4'-bipiperidinium diiodide*

2.02 g. of 1,1'-dimethyl-4,4'-bipiperidine in 10 ml. of benzene were added to a benzene solution of 2.0 ml. of methyl iodide. After standing for twenty hours, the precipitate which formed was separated and crystallized from methanol and then from water. The recrystallized material decomposed at approximately 350°–360° C. It was identified as 1,1;1',1'-tetramethyl-4,4'-bipiperidinium diiodide.

EXAMPLE 9

*1,1'-dimethyl-1,1'-diethyl-4,4'-bipiperidinium diiodide*

To 50 ml. of benzene containing 5.17 g. of 1,1'-dimethyl-4,4'-bipiperidine were added 4.5 ml. of ethyl iodide. After standing for 3 days at room temperature the crystals which formed were separated and recrystallized from ethanol; M. P. approximately 295°–299° C. (with decomposition). The product was identified as 1,1'-dimethyl-1,1'-diethyl-4,4'-bipiperidinium diiodide.

EXAMPLE 10

*1,1'-dimethyl-1,1'-bis-(carbethoxymethyl)-4,4'-bipiperidinium dibromide*

500 ml. of benzene containing 3.9 g. of 1,1'-dimethyl-4,4'-bipiperidine were refluxed for one half hour with 4.5 g. of ethyl monobromacetate. After standing for 24 hours at room temperature, the precipitate which had formed was filtered off, dried and crystallized from ethanol. The recrystallized material decomposed at approximately 225°–227° C. It was identified as 1,1'-dimethyl-1,1'-bis-(carbethoxymethyl)-4,4'-bipiperidinium dibromide.

EXAMPLE 11

*1,1'-bis-(3-carbethoxyallyl)-1,1'-dimethyl-4,4'-bipiperidinium dibromide*

10 ml. of ethyl γ-bromocrotonate were added to 200 ml. of benzene containing 5 g. of 1,1'-dimethyl-4,4'-bipiperidine. The mixture was allowed to stand at room temperature for 20 hours and the dark precipitate which had formed was separated. It was crystallized from acetonitrile-ether and then in turn from acetonitrile and from aqueous acetone. The product decomposed at approximately 223°–224° C. It was identified as 1,1'-bis-(3-carbethoxyallyl)-1,1'-dimethyl-4,4'-bipiperidinium dibromide.

EXAMPLE 12

*1,1'-dimethyl-1,1'-dibenzyl-4,4'-bipiperidinium dibromide*

To 50 ml. of benzene containing 3.8 g. of 1,1'-dimethyl-4,4'-bipiperidine were added 3.6 ml. of benzyl bromide. An immediate precipitation occurred. After standing a few hours, the crystals which formed were filtered off and recrystallized from methanol; M. P. approximately 280°–282° C. (with decomposition). The product was identified as 1,1'-dimethyl-1,1'-dibenzyl-4,4'-bipiperidinium dibromide monohydrate.

EXAMPLE 13

*1,1'-dimethyl-1,1'-bis-(p - methoxybenzyl)-4,4'-bipiperidinium dichloride*

To 50 ml. of benzene containing 2.4 g. of 1,1'-dimethyl-4,4'-bipiperidine were added 3 ml. of p-methoxy-benzyl chloride in 10 ml. of benzene. After standing for 21 hours at room temperature, a small amount of precipitate had formed. The reaction mixture was refluxed for ½ hour, cooled and the crystals filtered off. After recrystallization from ethanol-ether, from aqueous acetone and from water the crystals decomposed at approximately 265°–266° C. The product was identified as a hydrate of 1,1'-dimethyl-1,1'-bis-(p - methoxybenzyl)-4,4'-bipiperidinium dichloride. It retained varying amounts of water, depending upon the extent to which it was dried.

EXAMPLE 14

*1,1'-bis-(p-chlorobenzyl)-1,1'-dimethyl - 4,4'-bipiperidinium dichloride*

To 5.3 g. of 1,1'-dimethyl-4,4'-bipiperidine in 60 ml. of benzene were added 8.7 ml. of p-chlorobenzyl chloride. After standing at room temperature for 3 days, the crystals which formed were filtered off and recrystallized from methanol-ether. The purified material decomposed at approximately 262° C. It was identified as 1,1'-bis-(p-chlorobenzyl)-1,1'-dimethyl-4,4'-bipiperidinium dichloride monohydrate.

EXAMPLE 15

*1,1'-bis-(p-nitrobenzyl)-1,1'-dimethyl-4,4'-bipiperidinium dibromide*

To a refluxing solution of 1.9 g. of 1,1'-dimethyl-4,4'-bipiperidine in 200 ml. of benzene were added 4.5 g. of p-nitrobenzylbromide in 20 ml. of benzene. After refluxing for 2½ hours, the reaction mixture was cooled and filtered. The crystalline material thus obtained was recrystallized from methanol and then from water. The purified product decomposed at approximately 276° C. It was identified as 1,1'-bis-(p-nitrobenzyl)-1,1'-dimethyl-4,4'-bipiperidinium dibromide.

EXAMPLE 16

*1,1'-bis-(2-naphthylmethyl)-1,1'-dimethyl-4,4'-bipiperidinium dibromide*

A mixture of 295 mg. of 1,1'-dimethyl-4,4'-bipiperidine and 890 mg. of 2-bromomethyl naphthalene in benzene was allowed to remain at room temperature for two hours. The crystals which formed during this period were separated and recrystallized from ethanol. The product had a decomposition range of approximately 218°–249° C. It was identified as 1,1'-bis-(2-naphthylmethyl)-1,1'-dimethyl-4,4'-bipiperidinium dibromide monohydrate.

EXAMPLE 17

*1,1'-dicinnamyl-1,1'-dimethyl-4,4'-bipiperidinium dibromide*

1.7 g. of freshly prepared cinnamyl bromide were added to a benzene solution containing 415 mg. of 1,1'-dimethyl-4,4'-bipiperidine. After standing at room temperature for 3 hours, the crystals which formed were filtered off and recrystallized from ethanol. The product had a decomposition range of approximately 219°–241° C. It was identified as 1,1'-dicinnamyl-1,1'-dimethyl-4,4'-bipiperidinium dibromide.

EXAMPLE 18

*1,1'-bis-(3,4-dimethylbenzyl)-1,1'-dimethyl-4,4'-bipiperidinium dichloride*

2.0 g. of 1,1'-dimethyl-4,4'-bipiperidine and 3.5 ml. of 3,4-dimethylbenzylchloride were refluxed together in 150 ml. of benzene for 5 hours. After standing overnight at room temperature, the crystals which formed were filtered off and recrystallized from a methanol-acetone mixture. The compound had a decomposition range of approximately 219°–224° C. It was identified as 1,1'-bis-(3,4-dimethylbenzyl)-1,1'-dimethyl-4,4'-bipiperidinium dichloride monohydrate.

EXAMPLE 19

*1,1'-bis-(2-hydroxyethyl)-1,1'-diallyl-4,4'-bipiperidinium dibromide*

A benzene solution containing 1.3 ml. of allyl bromide was added to 2 g. of 1,1'-bis-(2-hydroxyethyl)-4,4'-bipiperidine in benzene. The mixture was heated to 60° C., 2.6 ml. of allyl bromide added and the temperature maintained at 60° C. After ½ hour at 60° C., the solution was refluxed for ½ hour and then allowed to stand at room temperature for 70 hours. The benzene was decanted from a small amount of gummy material which had formed, and evaporated to dryness in vacuo. The residue was crystallized from ethanol, whereupon the decomposition point remained constant at approximately 203°–218° C. The product was identified as 1,1'-bis-(2-hydroxyethyl)-1,1'-diallyl-4,4'-bipiperidinium dibromide.

EXAMPLE 20

*1,1'-bis-(2-hydroxyethyl)-1,1'-dibenzyl-4,4'-bipiperidinium dibromide*

To 150 ml. of refluxing benzene containing 2.15 g. of 1,1'-bis-(2-hydroxyethyl)-4,4'-bipiperidine were added 2.1 ml. of benzyl bromide in 10 ml. of benzene. After refluxing for 1 hour, the reaction mixture was concentrated to dryness in vacuo and the residue boiled with ethanol. The ethanol solution was cooled, decanted from insolubles and treated with ether. The crystals which formed from the ethanol-ether mixture were recrystallized from the same solvents. The purified compound decomposed at approximately 260° C. It was identified as 1,1'-bis-(2-hydroxyethyl)-1,1'-dibenzyl-4,4'-bipiperidinium dibromide.

EXAMPLE 21

*1,1'-bis-(2-hydroxyethyl)-1,1'-bis-(p-methoxybenzyl)-4,4'-bipiperidinium dichloride*

A mixture of 6.5 ml. of p-methoxybenzyl chloride and 5 g. of 1,1'-bis-(2-hydroxyethyl)-4,4'-bipiperidine in 200 ml. of benzene was refluxed for two hours. The crystals which formed on allowing the reaction mixture to stand at room temperature for 18 hours were filtered off and proved to consist mainly of the bipiperidine starting material. The residue obtained by evaporation of the benzene filtrate was crystallized from methanol-ether; M. P. approximately 243°–244° C. (with decomposition). This product was identified as 1,1'-bis-(2-hydroxyethyl)-1,1'-bis-(p-methoxybenzyl)-4,4'-bipiperidinium dichloride.

EXAMPLE 22

*1,1'-bis-(2-hydroxyethyl)-1,1'-diethyl-4,4'-bipiperidinium diiodide*

To 225 ml. of ethanol containing 12.3 g. of 1,1'-bis-(2-hydroxyethyl)-4,4'-bipiperidine were added 8 ml. of ethyl iodide and the resulting mixture was refluxed for two hours. After standing at room temperature for 25 hours, the crystals which had formed were separated and recrystallized from methanol; decomposition point approximately 248°–250° C. The product was identified as 1,1'-bis-(2-hydroxyethyl)-1,1'-diethyl-4,4'-bipiperidinium diiodide.

EXAMPLE 23

*1,1'-dibenzyl-1,1'-bis-(2-cyanoethyl)-4,4'-bipiperidinium dibromide*

A mixture of 3.6 g. of 1,1'-bis-(2-cyanoethyl)-4,4'-bipiperidine and 3.5 ml. of benzyl bromide was refluxed together in 400 ml. of benzene for 3 hours. The reaction mixture was evaporated to dryness in vacuo and the residue was crystallized from dilute acetone. The compound melted at approximately 315°–320° C. (with decomposition). It was identified as 1,1'-dibenzyl-1,1'-bis-(2-cyanoethyl)-4,4'-bipiperidinium dibromide dihydrate.

EXAMPLE 24

*1,1;1',1'-tetrabenzyl-4,4'-bipiperidinium dibromide*

A mixture of 2.7 g. of 1,1'-dibenzyl-4,4'-bipiperidine and 2.65 g. of benzyl bromide was refluxed together in 200 ml. of benzene for 2 hours. The crystalline residue obtained by evaporation of the clear reaction mixture was recrystallized from methanol. The purified material decomposed at approximately 300° C. It was identified as 1,1;1',1'-tetrabenzyl-4,4'-bipiperidinium dibromide sesquihydrate.

EXAMPLE 25

*1,1'-bis-[2-(diphenylacetoxy)-ethyl]-1,1'-dibenzyl-4,4'-bipiperidinium dibromide*

To 40 ml. of benzene containing 2.76 g. of 1,1'-bis - [2 - (diphenylacetoxy) - ethyl] - 4,4' - bipiperidine were added 1.1 ml. of benzyl bromide in 20 ml. of benzene. After refluxing for 4 hours, the reaction mixture was allowed to stand at room temperature for 19 hours. It was then concentrated to dryness in vacuo and the residue was crystallized from dilute alcohol. The compound decomposed at approximately 179°–189° C. It was identified as 1,1'-bis-[2-(diphenylacetoxy)-ethyl]-1,1'-dibenzyl-4,4'-bipiperidinium dibromide trihydrate.

EXAMPLE 26

*1,1;1',1'-di-tetramethylene-4,4'-bipiperidinium dibromide*

About 5 g. of solid potassium hydroxide were added to 20 ml. of warm water containing 3.2 g. of 1,1'-bis-(4-bromobutyl)-4,4'-bipiperidine dihydrobromide. An oil separated which crystallized on cooling. After recrystallization from ethanol-ether, the product melted at approximately 319°–320° C. It was identified as 1,1;1',1'-di-tetramethylene - 4,4'-bipiperidinium dibromide monohydrate.

We claim:
1. Symmetrical 1,1'-dimethyl-1,1'-bis-R-4,4'-bipiperidinium salts, wherein R is a radical selected from the group consisting of benzyl, p-methoxybenzyl, p-chlorobenzyl, p-nitrobenzyl and 3,4-dimethylbenzyl.
2. 1,1' - dimethyl - 1,1' - bis - (p - methoxybenzyl)-4,4'-bipiperidinium dichloride.
3. 1,1' - dimethyl - 1,1' - bis - (p - chlorobenzyl)-4,4'-bipiperidinium dichloride.
4. 1,1' - dimethyl - 1,1' - bis - (p - nitrobenzyl)-4,4'-bipiperidinium dibromide.
5. 1,1' - dimethyl - 1,1' - dibenzyl - 4',4' - bipiperidinium dibromide.

MOSES WOLF GOLDBERG.
LESTER MISCHA JAMPOLSKY.

REFERENCES CITED

The following references are of record in the file of this patent:

King et al.: J. Chem. Soc. (London), 1940, pp. 1307–1320.